(12) United States Patent
Sarh et al.

(10) Patent No.: US 9,511,496 B2
(45) Date of Patent: Dec. 6, 2016

(54) ROBOT ALIGNMENT SYSTEMS AND METHODS OF ALIGNING A ROBOT

(71) Applicant: The Boeing Company, Huntington Beach, CA (US)

(72) Inventors: Branko Sarh, Huntington Beach, CA (US); Chris J. Erickson, Garden Grove, CA (US); Michael L. Caldarera, La Palma, CA (US)

(73) Assignee: The Boeing Company, Chicago, IL (US)

( * ) Notice: Subject to any disclaimer, the term of this patent is extended or adjusted under 35 U.S.C. 154(b) by 223 days.

(21) Appl. No.: 14/311,041

(22) Filed: Jun. 20, 2014

(65) Prior Publication Data

US 2015/0367516 A1   Dec. 24, 2015

(51) Int. Cl.
| | |
|---|---|
| *B25J 9/16* | (2006.01) |
| *B25J 19/02* | (2006.01) |
| *B25J 9/00* | (2006.01) |
| *G01B 11/27* | (2006.01) |
| *G01C 3/02* | (2006.01) |
| *B25J 9/10* | (2006.01) |

(52) U.S. Cl.
CPC ............ *B25J 9/1697* (2013.01); *B25J 9/0042* (2013.01); *B25J 9/1687* (2013.01); *B25J 9/1692* (2013.01); *B25J 19/022* (2013.01); *B25J 19/023* (2013.01); *G01B 11/27* (2013.01); *G01C 3/02* (2013.01); *G05B 2219/45071* (2013.01); *Y10S 901/09* (2013.01); *Y10S 901/47* (2013.01)

(58) Field of Classification Search
CPC ..... B25J 9/004; B25J 17/0266; B25J 9/1692
USPC ....................................... 73/1.79
See application file for complete search history.

(56) References Cited

U.S. PATENT DOCUMENTS

| | | | | |
|---|---|---|---|---|
| 5,083,073 | A | * | 1/1992 | Kato ...................... B25J 9/1697 318/568.13 |
| 6,064,429 | A | | 5/2000 | Belk et al. |
| 6,330,837 | B1 | * | 12/2001 | Charles ................... B25J 11/00 74/490.06 |
| 6,428,452 | B1 | | 8/2002 | Dahlstrom |
| 6,681,151 | B1 | * | 1/2004 | Weinzimmer ......... B25J 9/1697 219/121.85 |

(Continued)

OTHER PUBLICATIONS

Sáez et al., "6DOF Entropy Minimization SLAM," IEEE International Conference on Robotics and Automation, Orlando, Florida, May 2006.

(Continued)

*Primary Examiner* — Daniel J Colilla
(74) *Attorney, Agent, or Firm* — Dascenzo Intellectual Property Law, P.C.

(57) ABSTRACT

Presently disclosed robotic alignment systems and methods may allow for alignment of a platform of a robot with respect to an access port of a part, such as a wing of an aircraft. A robot positioned under the wing may include a base and an upper platform coupled together by a plurality of legs. The upper platform may be moveable with respect to the base in six degrees of freedom in order to be aligned with the access port of the wing so that the robot may insert a tool through the access port without damaging the wing. Disclosed robotic alignment systems may include a calibration plate that is inserted into the access port. A number of positioning devices on the upper platform of the robot may interact with the calibration plate in order to align the upper platform with respect to the calibration plate, and thereby with respect to the access port.

27 Claims, 8 Drawing Sheets

(56) References Cited

U.S. PATENT DOCUMENTS

| | | | |
|---|---|---|---|
| 7,463,714 B2 | 12/2008 | Edwards et al. | |
| 7,576,850 B2 | 8/2009 | Englebart et al. | |
| 7,967,549 B2 | 6/2011 | Geist et al. | |
| 8,286,323 B2 | 10/2012 | Toh et al. | |
| 8,524,021 B2 | 9/2013 | Englebart et al. | |
| 8,542,876 B1 | 9/2013 | Engel et al. | |
| 2004/0202362 A1* | 10/2004 | Ishikawa | B25J 9/1692 382/153 |
| 2008/0155807 A1 | 7/2008 | Toh et al. | |
| 2009/0157226 A1* | 6/2009 | de Smet | B25J 9/1692 700/254 |
| 2010/0042382 A1 | 2/2010 | Marsh et al. | |
| 2011/0010007 A1* | 1/2011 | Sarh | B25J 5/007 700/248 |
| 2011/0014371 A1* | 1/2011 | Herre | B05B 12/1418 427/236 |
| 2011/0280472 A1* | 11/2011 | Wallack | B25J 9/1692 382/153 |
| 2013/0031764 A1 | 2/2013 | Sahr et al. | |
| 2014/0098018 A1* | 4/2014 | Kim | G06F 3/014 345/156 |
| 2014/0195148 A1 | 7/2014 | Erignac et al. | |

OTHER PUBLICATIONS

Nguyen et al., "A Lightweight SLAM Algorithm Using Orthogonal Planes for Indoor Mobile Robotics," IEEE/RSJ International Conference on Intelligent Robots and Systems, San Diego, California, Oct. 26-Nov. 2, 2007.

Unpublished U.S. Appl. No. 14/182,263 to Wu et al., titled Method and System for Monitoring and Verifying a Manufacturing Process, filed on Feb. 17, 2014.

Buckingham et al, "Snake-Arm Robots: A New Approach to Aircraft Assembly," SAE Technical Paper 2007-01-3870, 2007.

"High-Flying Robotics," online article downloaded from http://www.aint.com/news_detail.php?jobid=23 on Apr. 11, 2014.

"Accuracy is No. 1. Challenge," online article downloaded from http://www.assemblymag.com/articles/86647-accuracy-is-no-1-challenge on Apr. 11, 2014.

"Aerospace Case Study," online article downloaded from http://www.ocrobotics.com/applications--solutions/aerospace/aerospace-case-study/ on Apr. 11, 2014.

"Boeing Robotic Wingbox," online article downloaded from http://www.stonelinks.org/projects/wingbox.html on Apr. 11, 2014.

European Patent Office, Extended European Search Report for related European Patent Application No. EP 15167848, dated Aug. 8, 2016.

Roy et al, "Design of a Reconfigurable Robot Arm for Assembly Operations inside an Aircraft Wing-Box," Proceedings of the 2005 IEEE, International Conference on Robotics and Automation, Barcelona, Spain, pp. 590-595, Apr. 2005.

\* cited by examiner

ROBOT ALIGNMENT SYSTEMS AND METHODS OF ALIGNING A ROBOT

FIELD

The present disclosure relates to alignment systems for a robot, and methods of aligning a robot with respect to a fixed part or structure.

BACKGROUND

Robots and robotic systems are often used in manufacturing processes, such as in automotive and aerospace manufacturing. Such robots often perform tasks such as welding, painting, fastening, assembling, moving large loads, inspecting, and testing. Often, robots are used to perform tasks that are difficult and/or labor-intensive, and thus undesirable to be performed manually by workers or technicians. Some applications require that a robot operate a tool or other device through a hole or access port. For example, a robot may have a stationary base positioned outside of a part having a hole or access port that provides access to an interior space of the part. The robot may insert the tool or device through the hole or access port and then operate the tool or device inside the interior space of the part, from outside of the part.

Tasks performed by a robot often require precision and/or accuracy, and the robot must be able to precisely align or locate itself and/or the tool with respect to the part and/or access hole in order to ensure that it is able to perform its task. There remains a need for an alignment system and method of aligning a robot with respect to a part and/or its access port.

SUMMARY

Presently disclosed robotic alignment systems may allow for alignment of a platform with respect to an access port of a part, such as a wing of an aircraft. A robot positioned under the wing may include a base and an upper platform coupled together by a plurality of legs. The upper platform may be moveable with respect to the base in six degrees of freedom in order to be aligned with the access port of the wing so that a tool may be inserted through the access port without damaging the wing. Disclosed robotic alignment systems may include a calibration plate that is inserted into the access port. A number of positioning devices on the upper platform of the robot may interact with the calibration plate in order to align the upper platform with respect to the calibration plate, and thereby with respect to the access port.

Methods of aligning a platform of a robot with respect to an access port formed in a part are also disclosed. Methods may include projecting one or more laser lines onto a calibration plate that is positioned within or over the access port in order to determine a current position of the platform. The current position may be compared with a pre-programmed desired position to calculate dimensional offsets between the current position and the pre-programmed desired position. Then, the platform may be moved (e.g., automatically moved via instructions from a controller positioned on the robot) towards the pre-programmed desired position by eliminating the calculated dimensional offsets. Once the platform has been aligned with the calibration plate (and thereby with the access port of the part), the calibration plate may be removed, and the robot may be configured to move an end effector through the access port and into a space within the part in order to perform a task within the part.

DESCRIPTION

Figure 1:
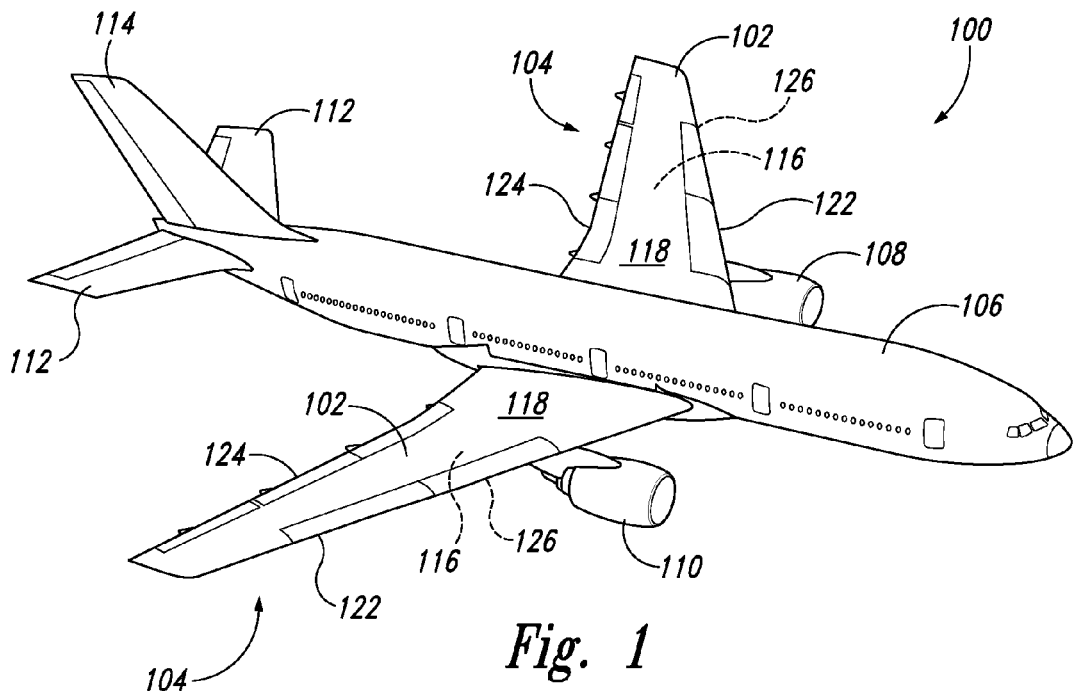
FIG. 1 is a perspective view of an illustrative, non-exclusive example of an aircraft.
Figure 2:
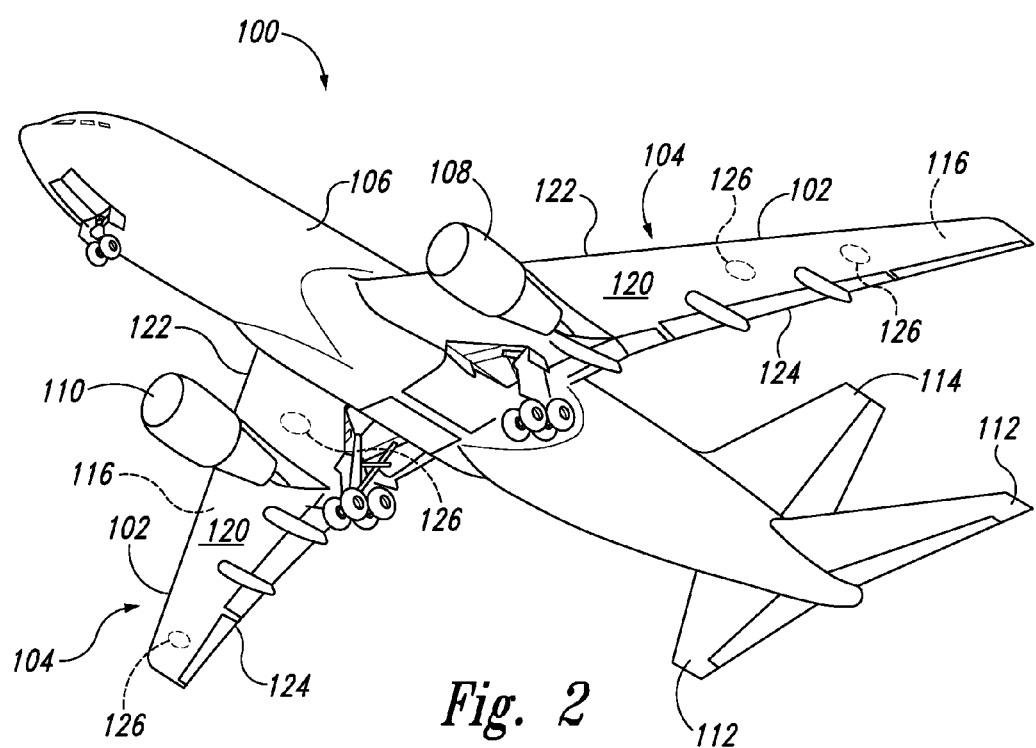
FIG. 2 is a perspective view of an illustrative, non-exclusive example of an aircraft, viewed from the underside of the aircraft.

Generally, with reference to FIGS. 1 and 2, an aircraft 100 may have wings 102 attached to a body 106. Aircraft 100 may include engines 108, 110. Aircraft 100 may include horizontal and/or vertical stabilizers 112, 114 respectively. Wings 102 may each form a wing box 104, where the wing box 104 is a three-dimensional structure surrounding and at least partially enclosing an interior space 116. The wing boxes 104 may be defined by an upper wing panel 118, a lower wing panel 120, a leading wing edge 122, and a trailing wing edge 124. Lower wing panel 120 of each wing 102 may include one or more holes, openings, or access ports 126 which can provide access to the interior space 116 of each wing box 104. For example, access ports 126 may be sized to allow a technician to crawl through and/or reach an arm or hand through, in order to access interior space 116 of the wing box 104 and perform various tasks within wing box 104, such as drilling, installing fasteners, painting, and/or inspecting wing box 104.

Figure 3:
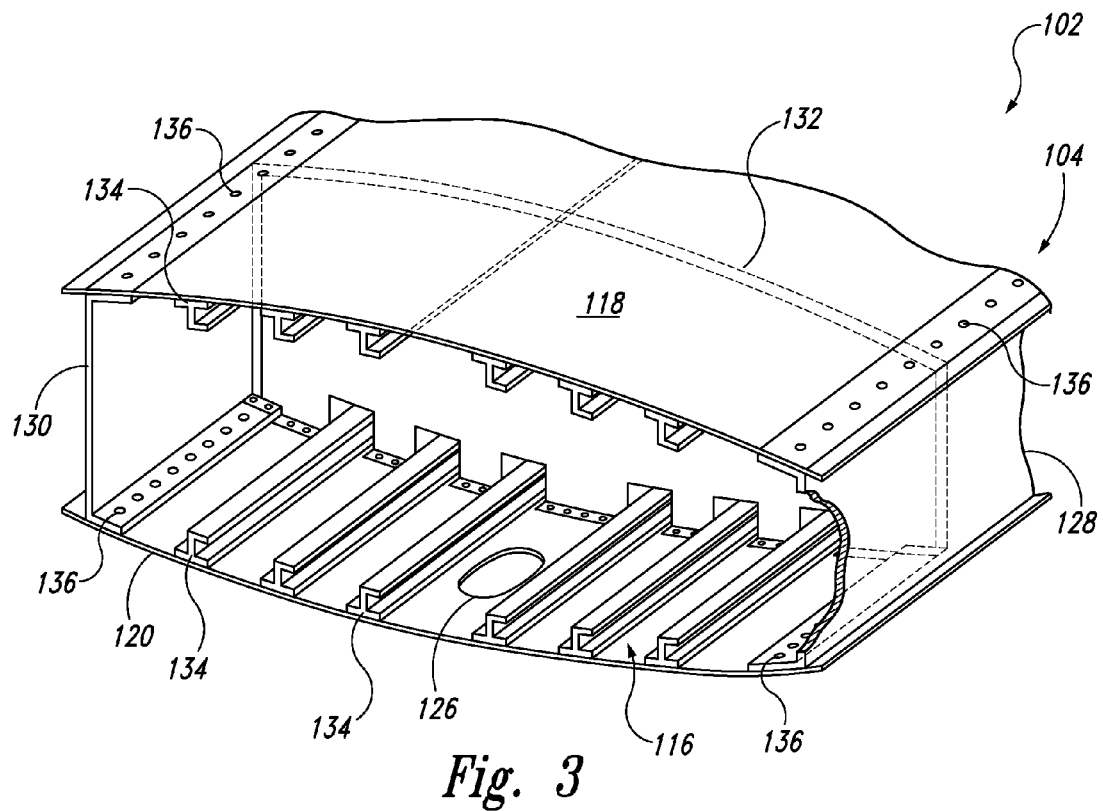
FIG. 3 is a perspective, partial cut-away view of a portion of a wing box of an aircraft.

FIG. 3 shows a cutaway section view of a portion of a wing box 104 of a wing 102. The interior area of wing box 104, generally designated by reference number 116, is an example of a confined or bounded area within which certain tasks may need to be performed. Wing box 104 may be comprised of a plurality of components including upper wing panel 118, lower wing panel 120, wing spars 128, 130, one or more wing ribs 132, and a plurality of stringers 134 running along the upper wing panel 118 and lower wing panel 120. A plurality of fasteners 136 may be used within or surrounding wing box 104 to secure various components and parts within wing box 104. For example, fasteners 136 may be used to secure upper wing panel 118 and lower wing panel 120 to spars 128, 130 and/or ribs 132. While only one rib 132 is visible in FIG. 3, wing boxes 104 extend along the length of wing 102 and generally include a plurality of ribs 132 along the length of wing box 104. Any suitable fasteners 136 may be used, including but not limited to screws, bolts, nuts, nails, adhesive, joints, pins, clamps, buckles, snaps, pegs, rings, staples, and etc.

During construction, assembly, and/or maintenance of the aircraft 100 and wings 102, tasks may need to be performed within interior space 116 (e.g., the space 116 between ribs 132 and spars 128, 130) of wing box 104. Such interior space 116 may be small and confined, difficult to maneuver inside, and/or may have limited lighting and ventilation. Some tasks within the interior space 116 of wing box 104 may require a worker or skilled technician to manually install thousands of screws while lying on his or her back. Once wing box 104 is closed, interior space 116 may only be accessible through the access ports 126. In order to perform tasks inside interior space 116, one may need to crawl through the access port 126 and/or reach through the access port 126 with one or both arms in order to perform tasks inside wing box 104, depending on the specific area being worked on. Further, there is the potential to cause serious and/or expensive damage to the wing while working within interior space 116, such as by damaging wing 102 with ladders or dropping tools within wing box 104. Thus, performing these tasks within interior space 116 may be labor-intensive, difficult, and/or unpleasant for those individuals performing the tasks in the confined spaces of wing box 104.

While robotics have been used in other industries to perform tasks that are labor-intensive and/or difficult for humans to perform, their use has been limited in this specific application due to the tight tolerance and precision required in aircraft manufacturing, the complexity of positioning a robot and a heavy end effector (e.g., a tool controlled by the robot that is specifically designed to perform a certain task) with respect to an access port, and/or the challenge of maneuvering the end effector past the access port and into the confined work space of the wing box. Currently disclosed alignment systems for a robot and methods of aligning a robot with respect to a fixed part or structure (e.g., a wing, wing box, and/or access port of a wing box) may address one or more of these difficulties.

Figure 4:
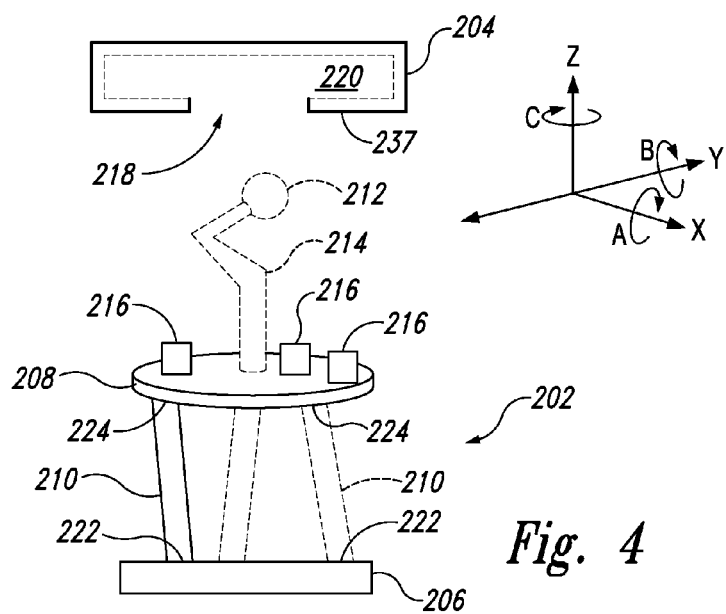
FIG. 4 is a schematic view of illustrative, non-exclusive examples of robotic alignment systems according to the present disclosure.
Figure 5:
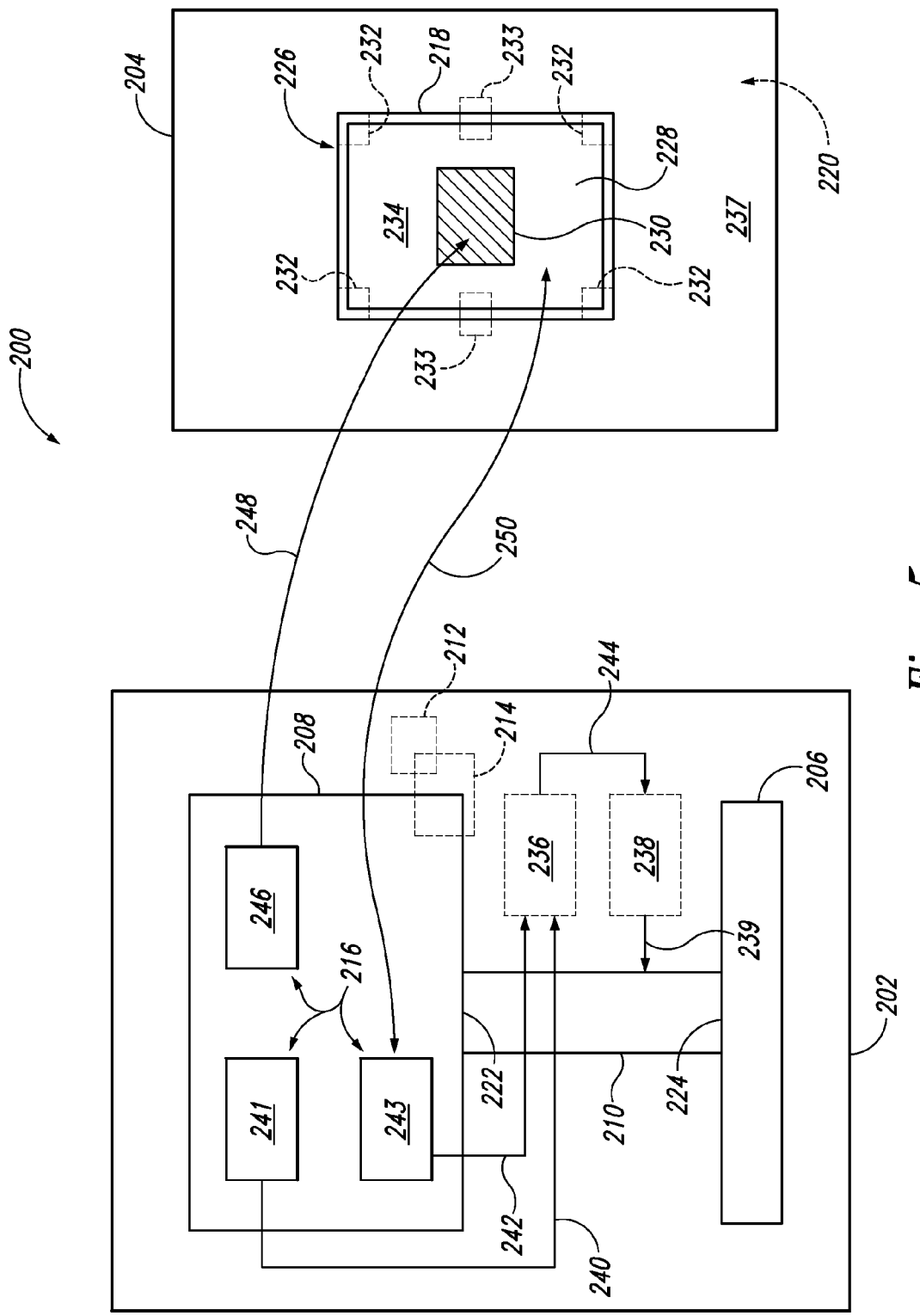
FIG. 5 is a schematic view of illustrative, non-exclusive examples of robotic alignment systems according to the present disclosure.

FIGS. 4-5 show schematic views of illustrative, non-exclusive examples of robotic alignment systems 200 according to the present disclosure. Alignment systems 200 generally include a robot 202 that may be aligned with a part or structure 204. Robot 202 may generally include a base 206, an upper platform 208, and one or more kinematic devices, such as legs 210 connecting base 206 to upper platform 208. Robot 202 may include an end effector 212 coupled to a moveable arm 214, the moveable arm 214 being secured at one end to upper platform 208. One or more positioning devices 216 may be positioned on or coupled to the robot 202, such as on upper platform 208. Positioning devices 216 may function to gather data needed to position upper platform 208, arm 214, and/or end effector 212 with respect to part 204 and/or a port or opening 218 formed in part 204. In this manner, arm 214 can maneuver end effector 212 towards part 204 and through opening 218, into an interior space 220 within part 204. Robot 202 may perform one or more tasks on part 204 and/or within interior space 220 of part 204, once so aligned. Disclosed robotic alignment systems may provide for precise access of a robotically-controlled end effector 212 to interior space 220 within part 204 without colliding with the part 204 or access port 218.

In some examples, robot 202 may be configured to perform one or more tasks that may include assembly tasks, inspection, sealant application, adhesive application, lock-bolt swaging, repair, deburring, drilling, extraction of foreign bodies, installation of components, insertion of wire looms, laser welding, leak detection, non-destructive testing, nut-running, painting, removal of debris (liquid, particulate, swarf), thermal imaging, fastening, wing assembly, composite layup, welding, trimming, routing, coating, repetitive assembly operations, automated box close-out, riveting, fitting, countersinking, manufacturing operations, welding, moving loads, and/or any other necessary or desired task for a given application.

Part 204 may be any part or structure in any application. For example, in manufacturing or maintenance applications, currently disclosed robots and robotic alignment systems may be used to align a robot and/or end effector with any type of part or structure, such as automotive parts, aerospace parts, industrial parts, machinery, commercial vehicles, transportation-related parts, construction-related parts, wind turbine blades or towers, and/or any part or structure, with or without an access port or opening, where it is desired to align a robotic system with said part in order to perform an automated task on or within the part. The present disclosure focuses on aerospace parts such as wing boxes, air-inlet ducts, and stabilizers, but it is understood that the presently disclosed methods and robotic systems are not limited to such.

Arm 214 may be any suitable structure and is generally configured to be moveable with respect to robot 202 (e.g., with respect to upper platform 208 and/or base 206). For example, arm 214 may be a folding arm, a telescoping arm, a retractable arm, a snake robot structure, an articulating arm and/or any structure that may be configured to position end effector 212 with respect to part 204 and/or opening 218. Illustrative examples of suitable arms 214 for use with the presently disclosed robotic systems 200 are disclosed in U.S. Pat. No. 7,967,549 and U.S. Patent Application Publication No. 2013/0031764, the disclosures of which are hereby incorporated by reference.

End effector 212 may be any device, such as a tool or sensor, that may be configured to perform a task on part 204 and/or within interior space 220. For example, end effector 212 may be a welding head, a spray paint gun, a scalpel, a cutting device, a fastening device, a gripping device, jaws, claws, pins, needles, a suction device, a camera, a sanding device, an adhesive applicator, a brush, a drill, a magnet, a screw driver, a clamp, a deburring tool, a rotary joint, and/or any customized tool designed for a specific task to be performed. Any end effector 212 may be used that is sufficiently sized to fit through the access port or opening of the part in or on which the task is being performed. End effector 212 may interact with the work environment (e.g., part 204) and may be customized for a particular application. Robotic alignment systems 200 may use one or more different end effectors 212 for different tasks within part 204.

End effector 212 may be coupled to arm 214 such that movement of arm 214 results in movement of end effector 212 as well. Arm 214 thus may be configured to position end effector 212 with respect to opening 218 and/or part 204 so that a task may be performed by end effector 212. End effector 212 may be removable from arm 214 and changed out for a different end effector in order to perform a different task, if desired. Illustrative examples of suitable end effectors 212 for use with the presently disclosed robotic systems 200 are disclosed in U.S. Pat. No. 8,286,323, the disclosure of which is hereby incorporated by reference.

Base 206 may be any suitable size and shape, and may generally be configured to provide a stable support for robot 202. For example, base 206 may be configured to remain stable and stationary on a flat surface while legs 210, upper platform 208, arm 214, and/or end effector 212 are moved with respect to base 206. Base 206 may be, for example, round, square, rectangular, polygonal, elliptical, or any other suitable shape. Base 206 optionally may include one or more wheels to facilitate moving robot 202. Base 206 may be heavy enough and stable enough to remain stationary while other components of robot 202 are moving (e.g., base 206 may be large enough and heavy enough, such as a large steel plate, to support the weight of the rest of robotic alignment system 202 without tipping or moving as the other components move). In some examples, base 206 may be externally stabilized, or locked in place. For example, base 206 may be positioned near or underneath a part being manufactured, such as a wing box in a manufacturing facility, and then base 206 may be secured to the factory floor to ensure that base 206 does not move with respect to the part or access port.

Legs 210 may be provided that couple base 206 to upper platform 208. Any suitable number of legs 210 may be included for a given robotic system 200 according to the present disclosure. For example, one, two, three, four, five, six, seven, eight, nine, or ten or more legs 210 may be provided. Legs 210 may be any suitable size and shape and may be configured to move upper platform 208 with respect to base 206. For example, legs 210 may be rotatable, telescoping, articulating, foldable, pivotable, hinged, and/or a combination of the above. In some examples, each leg 210 has a first end 222 coupled to base 206 and a second end 224 coupled to upper platform 208. Legs 210 may be configured to move upper platform 208 up and down with respect to base 206 (e.g., towards and away from base 206) and/or may be configured to tilt upper platform 208 with respect to base 206 and/or may be configured to rotate upper platform 208 with respect to base 206. Legs 210 may be independently moveable with respect to one another in some examples. Legs 210 may be configured to move upper platform 208 in six degrees of freedom (e.g., in six different axes of movement, or six different three-dimensional directions) with respect to base 206.

One or more positioning devices 216 may be positioned on and/or around upper platform 208, on arm 214, and/or on end effector 212 and may be configured to gather data about the current position of platform 208 in order to align and position upper platform 208 with respect to part 204 (e.g., specifically with respect to opening 218 of part 204). As shown in FIG. 5, positioning devices 216 may include one or more laser devices 246 (e.g., a linear laser), laser range finders 243, cameras 241, ultrasonic sensors, and/or any other distance sensing device. While three positioning devices 216 are illustrated in FIG. 4, any number of positioning devices 216 may be included such as two or more, three or more, four or more, five or more, six or more, seven or more, eight or more, nine or more, and/or ten or more positioning devices 216. Positioning devices 216 may be the same or different types of positioning devices. For example, positioning device 216 may include one or more lasers (also referred to herein as laser devices), one or more laser range finders, and/or one or more cameras in certain examples. Various robotic alignment systems 200 according to the present disclosure may include one or more lasers 246, one or more laser range finders 243, and/or one or more cameras 241 coupled to robot 202, as shown in FIG. 5.

Operation of robotic alignment system 200 may be fully automatic, semi-automatic, manual, tele-operated, vision-assisted, or a combination of the above. For example, base 206 may be manually positioned on a surface (e.g., the ground, a platform, a floor) under or near part 204. In one example, robot 202 may be roughly positioned on a floor under an access port of a wing box. Legs 210 and/or arm 214 may be moved automatically (e.g., autonomously, or without manual intervention, once initiated) to position or align upper platform 208 and/or end effector 212 with respect to opening 218 of part 204. Arm 214 may be configured to then automatically move end effector 212 through opening 218 and into interior space 220 of part 204. In other examples, once upper platform 208 is automatically aligned with opening 218, an operator may remotely control and operate end effector 212 and arm 214 to perform one or more tasks within part 204.

Disclosed robotic alignment systems 200 may include a calibration plate 226 (FIG. 5) that may be used by positioning devices 216 to gather data to align upper platform 208 with respect to opening 218 of part 204. Calibration plate 226 may include a base plate 228, an image 230 (which also may be referred to as a calibration image 230), one or more periphery locators 232, and/or one or more surface locators 233. In use, base plate 228 may be positioned within opening 218 of part 204. For example, base plate 228 may be sized and shaped to just fit within opening 218, such as with a friction fit or press fit. In other examples, latches or clamps may be used to hold calibration plate 226 in place within opening 218. As will be discussed in greater detail in connection with FIGS. 7-8, periphery locators 232 and/or surface locators 233 may be used to hold calibration plate 226 in place within opening 218. In examples where opening 218 is an elliptical opening, base plate 228 also may be elliptical, having approximately the same shape and dimensions as opening 218. Similarly, in examples where opening 218 is rectangular or some other shape, base plate 228 may be rectangular (or the respective shape of the opening) in order to be inserted into and positioned within opening 218.

Image 230 may be presented on a lower plate surface 234 of base plate 228. For example, image 230 may be printed on lower plate surface 234, applied to lower plate surface 234 (e.g., such as by applying a sticker, decal, painting, or otherwise adhering image 230 to lower plate surface 234), formed integrally with lower plate surface 234 (e.g., lower plate surface 234 itself may include image 230), and/or projected onto lower plate surface 234. Image 230 may have any appearance and may cover a portion of lower plate surface 234 or may cover substantially the entire lower plate surface 234 in some examples. The perimeter of image 230 may be circular, elliptical, square, rectangular, triangular, diamond-shaped, cross-shaped, polygonal, or any suitable shape. Image 230 may include one color, two or more colors, three or more colors, five or more colors, or may be full color (e.g., 256 or more colors). In some examples, image 230 may be black and white. Image 230 may be a pattern, such as a repeating or alternating pattern. In one specific example, image 230 may be a checkerboard pattern of alternating colored squares (e.g., a plurality of adjacent rows and columns of alternating black and white squares), having an overall square perimeter.

Periphery locators 232 may be positioned at any suitable location or locations around or near the perimeter of base plate 228. Periphery locators 232 may interact with hardware inside opening 218 and/or may interact with opening 218 itself in order to lock calibration plate 226 into place within opening 218. Likewise, surface locators 233 may be positioned at any suitable location or locations around or near the perimeter of base plate 228. Surface locators 233 may engage with a lower part surface 237 and may be configured to prevent insertion of calibration plate 226 too far into access port 218. For example, surface locators 233 may be configured to limit how far calibration plate 226 may be inserted into access port 218 and/or interior space 220.

Robot 202 may additionally include a processor 236 and/or a controller 238 (FIG. 5). Processor 236 and/or controller 238 may be located on robot 202 (such as, for example, coupled to platform 208 and/or base 206) or located remotely from robot 202. In use, one or more linear lasers 246 may project a laser beam 248 (which may also referred to herein as a visible laser beam 248, a laser line 248, and/or a projected laser 248) onto calibration plate 226 (e.g., onto image 230 of calibration plate 226), such that the laser beam 248 is visible on calibration plate 226. One or more cameras 241 may utilize the visible laser beams 248 projected on calibration image 230 in order to obtain feedback data regarding the current position of platform 208. For example, camera 241 may capture, record, obtain, and/or analyze image data 240, such as a picture of the visible laser beams 248 projected onto calibration image 230. In some examples, image data 240 obtained and/or generated by camera 241, such as a picture of visible laser beams 248 projected onto calibration image 230 may be saved, stored, displayed, and/or printed. In some examples, a picture of visible laser beams 248 projected onto calibration image 230 may be temporarily or permanently stored for analysis by processor 236. In some examples, camera 241 may obtain and/or generate image data 240, such as visual data, light data, and/or other information regarding position of the visible laser beams 248 (e.g., the distance in one or more directions between each of the visible laser beams 248 and a center 260 of calibration image 230) using an edge detection or other algorithm, without capturing or storing a picture of the visible laser beams 248 projected onto calibration image 230.

One or more laser range finders 243 coupled to upper platform 208 may use a range laser 250 to measure one or more respective distances between the respective laser range finder 243 and the part 204 (e.g., lower surface 237 of part 204) and/or between the respective laser range finder 243 and calibration plate 226. Processor 236 may receive image data 240 from one or more cameras 241 and/or range data 242 from one or more laser range finders 243. Processor 236 may process image data 240 and/or range data 242 in order to calculate offset data 244. Offset data 244 may include information regarding dimensional offsets between a desired pre-programmed position or distance and the current position of platform 208 relative to calibration plate 226.

Offset data 244 may include offset data in a plurality of axes. In some examples, offset data 244 may include information about dimensional offsets in six axes, the six axes corresponding to six degrees of freedom for platform 208. Processor 236 may send offset data to controller 238, which in turn may instruct kinematic devices such as legs 210, via a signal 239, to eliminate the detected dimensional offsets in order to move platform 208 to the desired position, thereby aligning platform 208 with calibration plate 226 and opening 218 of part 204 in preparation for performing a task inside part 204.

In one specific example, six degrees of freedom of platform 208 may correspond to axes A, B, C, X, Y, and Z (FIG. 4). Linear laser 246 may include a first linear laser and a second linear laser, the first linear laser being configured to project a first visible laser beam onto calibration image 230 and the second linear laser being configured to project a second visible laser beam onto calibration image 230, the second visible laser beam being approximately perpendicular to the first visible laser beam. Processor 236 may compare the location of the first and the second lasers to aspects of calibration image 230 in order to determine dimensional offsets based on image data 240 obtained and/or generated by camera 241. Such dimensional offsets may be used by controller 238 to instruct legs 210 to move platform 208 in the X, Y, and/or C directions to eliminate the offsets detected by the camera system. These steps may be repeated as desired until desired tolerances are met.

Laser range finder 243 may include a first laser range finder, a second laser range finder, a third laser range finder, and/or a fourth laser range finder. In some examples, the first laser range finder and the second laser range finder may be positioned approximately along the X-axis of platform 208, and the third laser range finder and the fourth laser range finder may be positioned approximately along the Y-axis of platform 208 (e.g., a first line formed between the first laser range finder and the second laser range finder may be approximately perpendicular to a second line formed between the third laser range finder and the fourth laser range finder). Range data 242 from the first laser range finder and the second laser range finder may be compared to desired values by processor 236, and controller 238 may instruct movement of platform 208 in the B and Z axes. Similarly, range data 242 from the third laser range finder and the fourth laser range finder may be compared to desired values by processor 236, and controller 238 may instruct movement of platform 208 in the A and Z axes.

In other examples, more or fewer positioning devices 216 may be included. Further, different positioning devices 216 may be configured to receive data related to different axes of movement than described above.

While disclosed examples generally relate to examples where robot 202 is positioned underneath part 204 and opening 218 (e.g., having a substantially horizontally-arranged upper platform facing a substantially horizontally-arranged part), other arrangements are possible. In general, robotic alignment systems 200 may be positioned with respect to an opening of a part in any orientation that allows the "upper" platform to face a surface of the part containing an access port or opening. Thus, the "upper" platform may be positioned lower than the base of the robot, to the side of the base, or in some other orientation with respect to the base in certain applications. In some examples, robotic alignment systems may be positioned above a part, or to the side of a part having an access port. In some examples, the upper platform may be substantially vertically arranged and facing a substantially vertically arranged part or access port. Generally, the plane of the upper platform may be substantially parallel to the plane of the access port of the part.

Turning now to FIGS. 6-9, illustrative non-exclusive examples of robotic alignment systems in the form of robots, calibration plates, and robotic alignment systems are illustrated. Where appropriate, the reference numerals from the schematic illustrations of FIGS. 4-5 are used to designate corresponding parts of disclosed robotic alignment systems, however, the examples of FIGS. 6-9 are non-exclusive and do not limit the disclosed robotic alignment systems to the illustrated embodiments of FIGS. 6-9. That is, disclosed robotic alignment systems are not limited to the specific embodiments of the illustrated FIGS. 6-9 and may incorporate any number of the various aspects, configurations, characteristics, properties, etc. that are illustrated in and discussed with reference to the schematic representations of FIGS. 4-5 and/or the embodiments of FIGS. 6-9, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 6-9, however, it is within the scope of the present disclosure that the previously discussed features, variants, etc. may be utilized with each of these examples.

Figure 6:
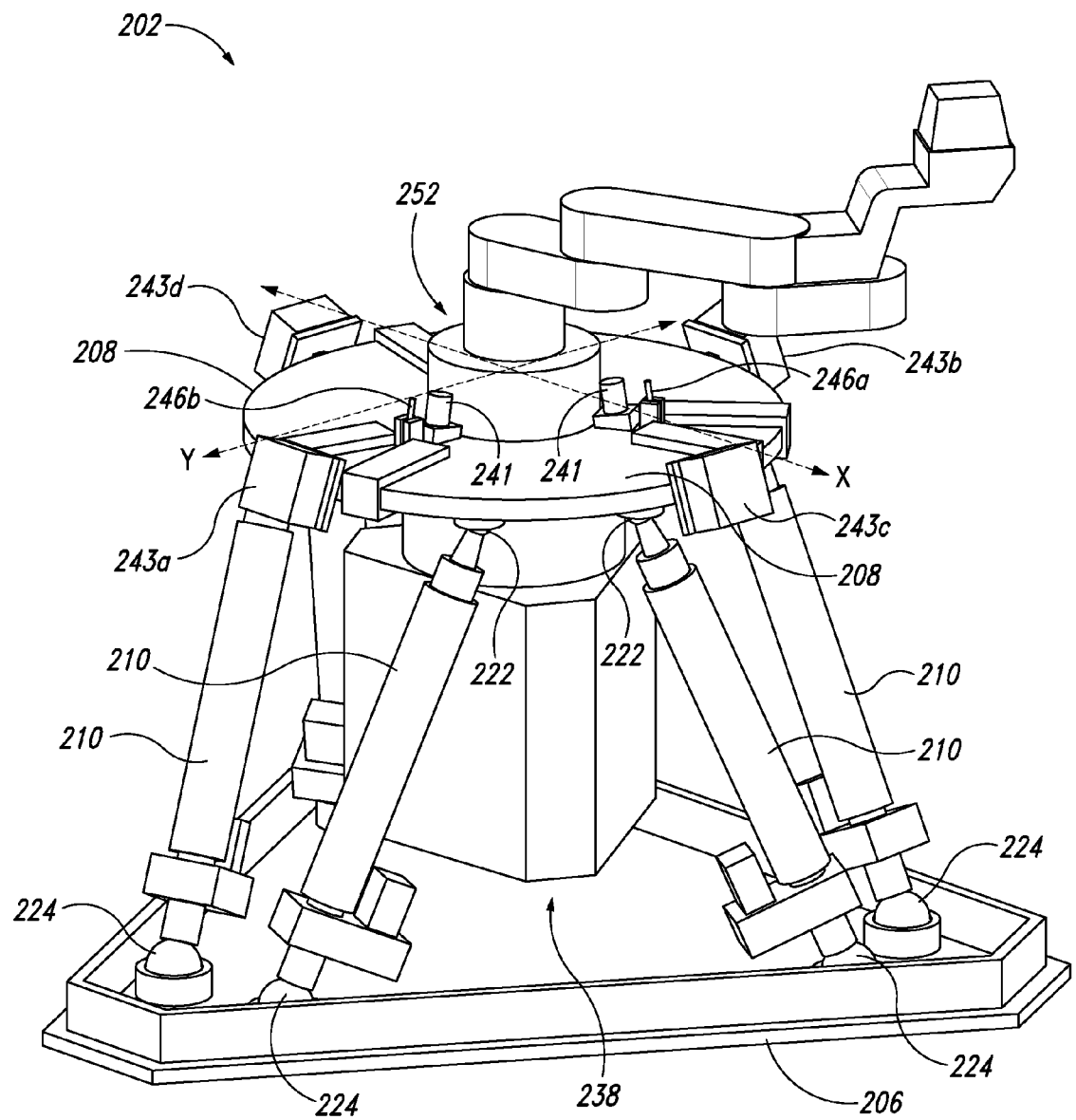
FIG. 6 is a top perspective view of an illustrative, non-exclusive example of a robot for use as part of a robotic alignment system according to the present disclosure.

FIG. 6 shows a top, perspective view of an example of a robot 202 that can be utilized as a component of robotic alignment systems according to the present disclosure. Robot 202 may include a base 206 and an upper platform 208. Kinematic devices such as legs 210 may be coupled at a first end 222 to upper platform 208 and at a second end 224 to base 206. Legs 210 may be telescoping and/or arranged at various orientations with respect to base 206 and upper platform 208. Legs 210 may be hinged at one or both ends 222, 224, and may be configured to move upper platform 208 with six degrees of freedom with respect to base 206 in response to signals received from a controller 238.

Upper platform 208 may include one or more positioning devices, such as one or more linear lasers 246, one or more laser range finders 243, and/or one or more cameras 241. As shown in FIG. 6, laser range finders 243a, 243b, 243c, and 243d may be aligned in a particular arrangement on upper platform 208. For example, two laser range finders (e.g., laser range finders 243a and 243b) may be approximately aligned with the Y axis of upper platform 208, and two other laser range finders (e.g., laser range finders 243c and 243d) may be approximately aligned with the X axis of upper platform 208. One linear laser (e.g., linear laser 246a) may be positioned adjacent a laser range finder aligned with the Y axis (e.g., laser range finder 243a), and another linear laser (e.g., linear laser 246b) may be positioned adjacent a laser range finder aligned with the X axis (e.g., laser range finder 243d).

Upper platform 208 may include a quick changer 252 that may be configured to allow a robotic arm (or one of a plurality of interchangeable robotic arms) to be coupled to and removed from quick changer 252. Quick changer 252 can provide an interface between controller 238 and the robotic arm coupled to robot 202 such that the robotic arm may receive signals from controller 238 through quick changer 252.

Figure 7:
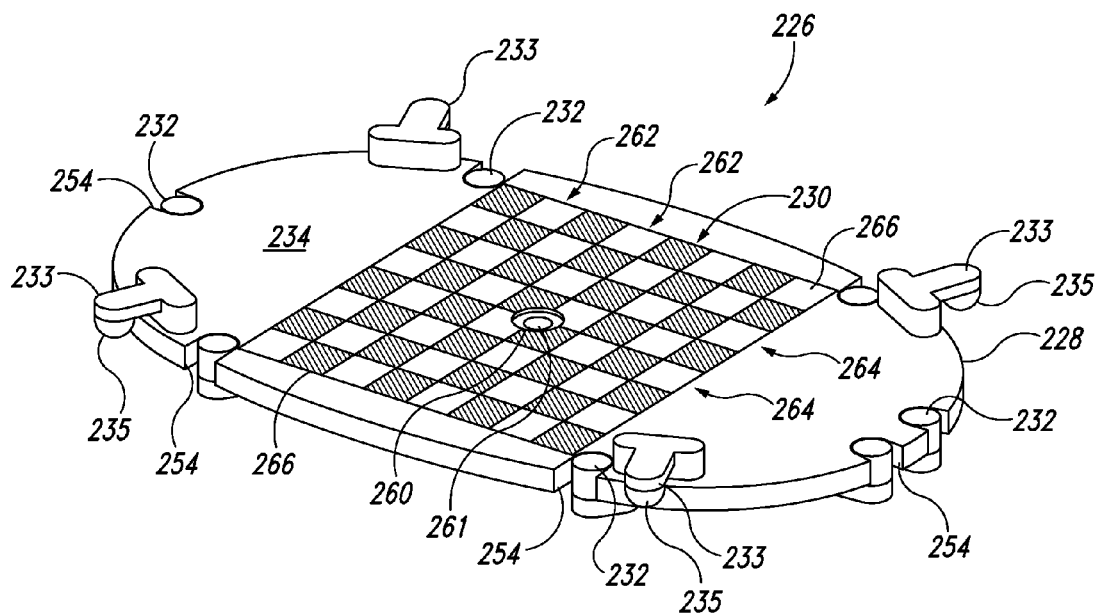
FIG. 7 is a bottom perspective view of an illustrative, non-exclusive example of a calibration plate of a robotic alignment system according to the present disclosure.
Figure 8:
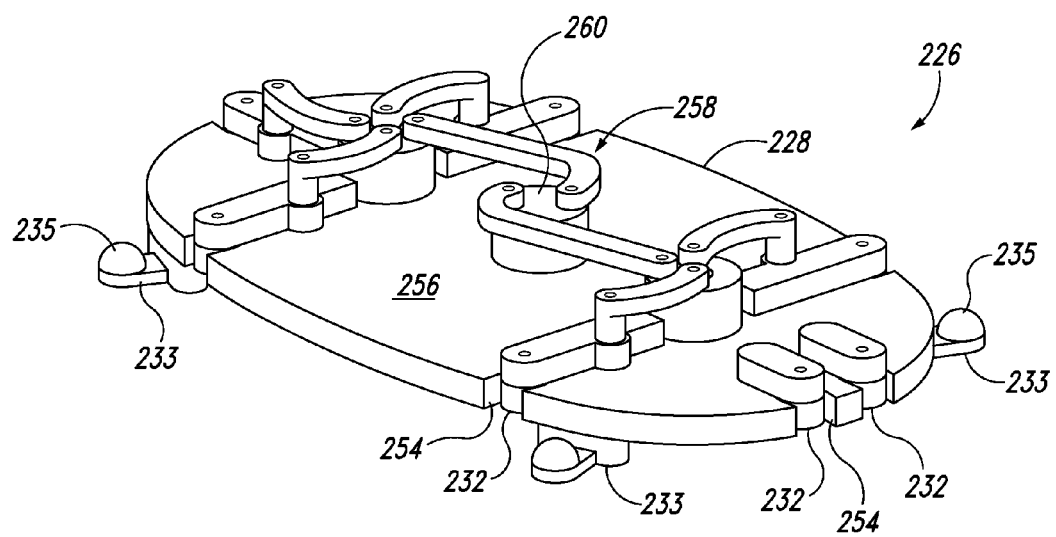
FIG. 8 is a top perspective view of the calibration plate of FIG. 7.

FIGS. 7-8 show a bottom perspective view (FIG. 7) and a top perspective view (FIG. 8) of an example of a calibration plate 226 according to the present disclosure. Calibration plate 226 may be configured to be positioned within an opening or access port of a part, such as a wing box of an aircraft. Calibration plate 226 may be sized and shaped to essentially obstruct the entire access port or opening, and may be positioned within an access port via a press fit or clearance fit. Generally, calibration plate 226 may include a base plate 228 having a lower plate surface 234 and an upper plate surface 256. When positioned within an access port, calibration base plate 228 may be oriented such that lower plate surface 234 faces outward of the part (e.g., generally will be facing downwards, towards a robot positioned underneath the part) and upper plate surface 256 may generally be facing upwards into the interior space within the part (e.g., facing the interior of a wing box). Lower plate surface 234 may include a calibration image 230.

Calibration plate 226 may include hardware for securing it within an access port. For example, one or more periphery locators 232 may be positioned around the periphery, or circumference, of calibration plate 226. Each of such periphery locators 232 may be moveable into and out of a respective slot 254 formed in the outer circumference of calibration plate 226. Movement of periphery locators 232 may be accomplished by a latch locking mechanism 258 (FIG. 8) which may be configured to move periphery locators 232 radially outward and/or inward. For example, latch locking mechanism 258 may be configured to move periphery locators 232 radially outward until one or more of the periphery locators 232 is engaged with an access port.

Calibration plate 226 also may include one or more surface locators 233. Surface locators 233 may be positioned adjacent the periphery, or outer circumference, of base plate 228, and may be coupled to the lower plate surface 234 and/or upper plate surface 256. For example, one or more surface locators 233 may be coupled to lower plate surface 234 and/or one or more surface locators 233 may be coupled to upper plate surface 256. Surface locators 233 may be stationary with respect to base plate 228 or they may be moveable with respect to base plate 228. Each surface locator 233 may include an engagement portion 235 that is configured to engage with a surface of a part. For example, engagement portions 235 may be configured to engage with an outer surface of a part (e.g., an outer, lower surface of a wing box) and/or an inner surface of a part (e.g., an interior surface within a wing box). Engagement portions 235 may be, for example, a hemispherical rubber engagement portion, or may be of any shape or material. Engagement portions 235 may be configured to exert pressure on a surface of a part without damaging the part (e.g., without scratching or denting the part). Surface locators 233 may be configured to prevent insertion of calibration plate 226 too far into the part or access port. For example, once engagement portions 235 contact the part, such contact may prevent calibration plate 226 from being further inserted into the access port. Four surface locators 233 are shown in FIGS. 7-8, but more or fewer surface locators 233 may be included in other examples.

Once calibration plate 226 is positioned within an access port of a part, latch locking mechanism 258 may be configured to lock periphery locators 232 in position, such that the access port in which the calibration plate 226 is positioned does not force periphery locators 232 radially inward into slots 254, but rather the periphery locators 232 are pressed into the edge of the access port. Latch locking mechanism 258 may be unlocked and periphery locators 232 may be moved radially inward into slots 254 in order to remove calibration plate 226 from an access port. In some examples, latch locking mechanism 258 may be positioned on and/or coupled to upper plate surface 256, but operable or accessible from the other side of calibration plate 226. For example, an operator may have access to latch locking mechanism 258 via a tool extending through a central opening 260 formed in base plate 228. In this manner, a calibration plate 226 may be positioned within an access port such that latch locking mechanism 258 is enclosed within an interior space of a part, and yet latch locking mechanism 258 may be accessible from bottom plate surface 234 so that an operator can control latch locking mechanism 258 from outside of the part once calibration plate 226 is initially positioned within an access port of the part.

Calibration image 230 may be positioned on bottom plate surface 234 such that it faces away and outward from an access port of a part when calibration plate 226 is positioned within said access port. In this manner, a robot positioned away from calibration plate 226 (e.g., beneath it and separated from calibration plate 226 by a non-zero distance) may interact with calibration image 230. Calibration image 230 may be a decal or otherwise adhered to or applied to lower plate surface 234, may be printed, painted, or otherwise added to lower plate surface 234, and/or may be formed integrally with lower plate surface 234 (e.g., lower plate surface 234 may be formed of different colored materials in order to form calibration image 230). Calibration image 230 may be any suitable image or pattern, and may be configured to provide a reference for a robot to align with, according to the present disclosure. According to some examples, a robot may align an upper platform with calibration image 230 on calibration plate 226. Such alignment may assure that the upper platform is thereby aligned with the access port in which the calibration plate 226 is positioned.

As shown in FIG. 7, calibration image 230, in some examples, may consist of a checkerboard pattern of alternating squares, but images 230 are not limited to such. In the non-exclusive, illustrated example, calibration image 230 may include a plurality of rows 262 and a plurality of columns 264 of smaller squares 266 that are arranged to form a larger overall square-shaped calibration image 230. Smaller squares 266 may be alternating black and white squares 266, or may be any suitable colors. Generally, calibration image 230 may include sharp, highly contrasted edges in order to provide alignment feedback to a robot.

Figure 9:
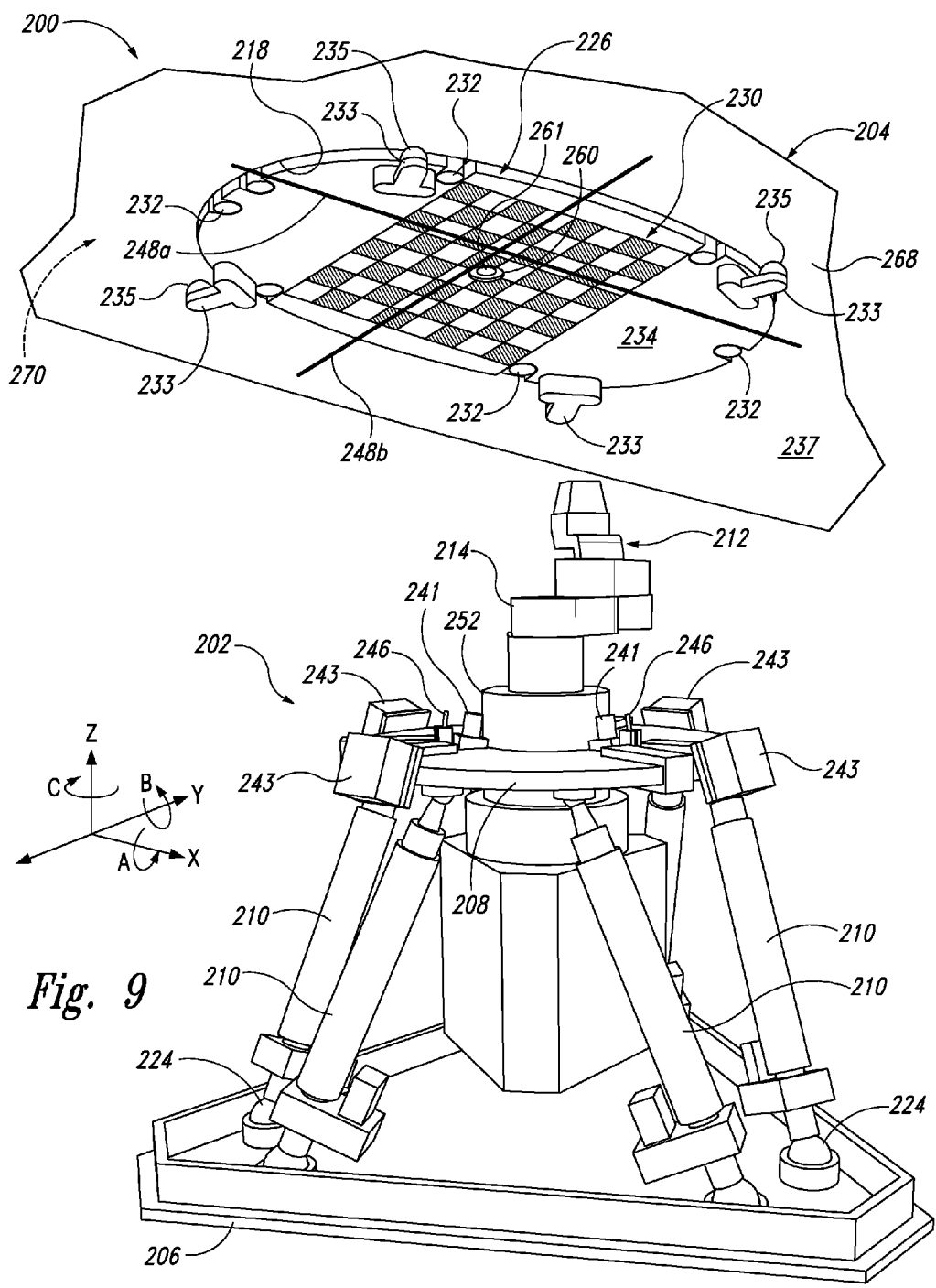
FIG. 9 is a perspective view of an illustrative, non-exclusive example of a robotic alignment system according to the present disclosure.

FIG. 9 illustrates an example of a robotic alignment system 200 according to the present disclosure, in place with respect to a part 204, such as a wing 268. Wing 268 may define an interior space 270 within wing 268, having an access port 218. As shown in FIG. 9, a calibration plate 226 may be locked into position within access port 218, and robot 202 may be positioned beneath calibration plate 226. One or more linear lasers 246 positioned on an upper platform 208 of robot 202 may project visible laser beams 248a, 248b onto calibration image 230 of calibration plate 226. As seen in FIG. 9, visible laser beams 248a, 248b may be approximately perpendicular to one another and projected onto to or near calibration image 230. Cameras 241 may capture a picture of the projected visible laser beams 248a, 248b on calibration image 230 of calibration plate 226. Data from the cameras 241 may be processed (e.g., position of the projected visible laser beams 248a, 248b may be compared to aspects of calibration image 230, and offsets may be determined between the robot's current alignment/position and a desired position). For example, offsets may be determined between the current position of the visible laser beams 248a, 248b and the center 260 of calibration image 230. Data may be generated that includes a Y offset (e.g., the distance between visible laser beam 248b and the center 260 of calibration image 230), and an X offset (e.g., the distance between visible laser beam 248a and the center 261 of calibration image 230). Such processed data may then be used to adjust the position and alignment of upper platform 208 in the X, Y, and C directions, with respect to calibration plate 226. For example, upper platform 208 may be moved by legs 210 in the X, Y, and/or C directions until the offsets are substantially eliminated within acceptable tolerances (e.g., until visible laser beams 248a, 248b are centered on calibration image 230 and intersect at the center 261 of calibration image 230).

Each of a plurality of laser range finders 243 coupled to upper platform 208 may be configured to measure a respective distance between upper platform 208 and wing 268 (e.g., lower surface 237 of wing 268). Measured distances may be compared to pre-programmed desired values, and dimensional offsets between the current position of robot 202 and the desired position may be used to adjust the position of upper platform 208 in the A, B, and Z directions. For example, legs 210 may adjust the position of upper platform 208 until such dimensional offsets are substantially eliminated within a desired tolerance.

Robot 202 also may include a robotic arm 214 coupled to upper platform 208 via a quick changer 252. Robotic arm 214 may include an end effector 212 at one end of arm 214, such end effector 212 being configured to perform a task within interior space 270 of wing 268 (e.g., arm 214 may be configured to move end effector 212 through access port 218 and inside the wing box formed by wing 268, once upper platform 208 has been positioned and aligned with respect to access port 218). Alignment of upper platform 208 with respect to calibration plate 226 as described above, can allow robot 202 to have information regarding its exact position with respect to access port 218. In this manner, robot 202 may be configured to know its position and may be able to maneuver arm 214 and end effector 212 into interior space 270 with precision and accuracy, and without colliding with access port 218 or wing 268.

Figure 10:
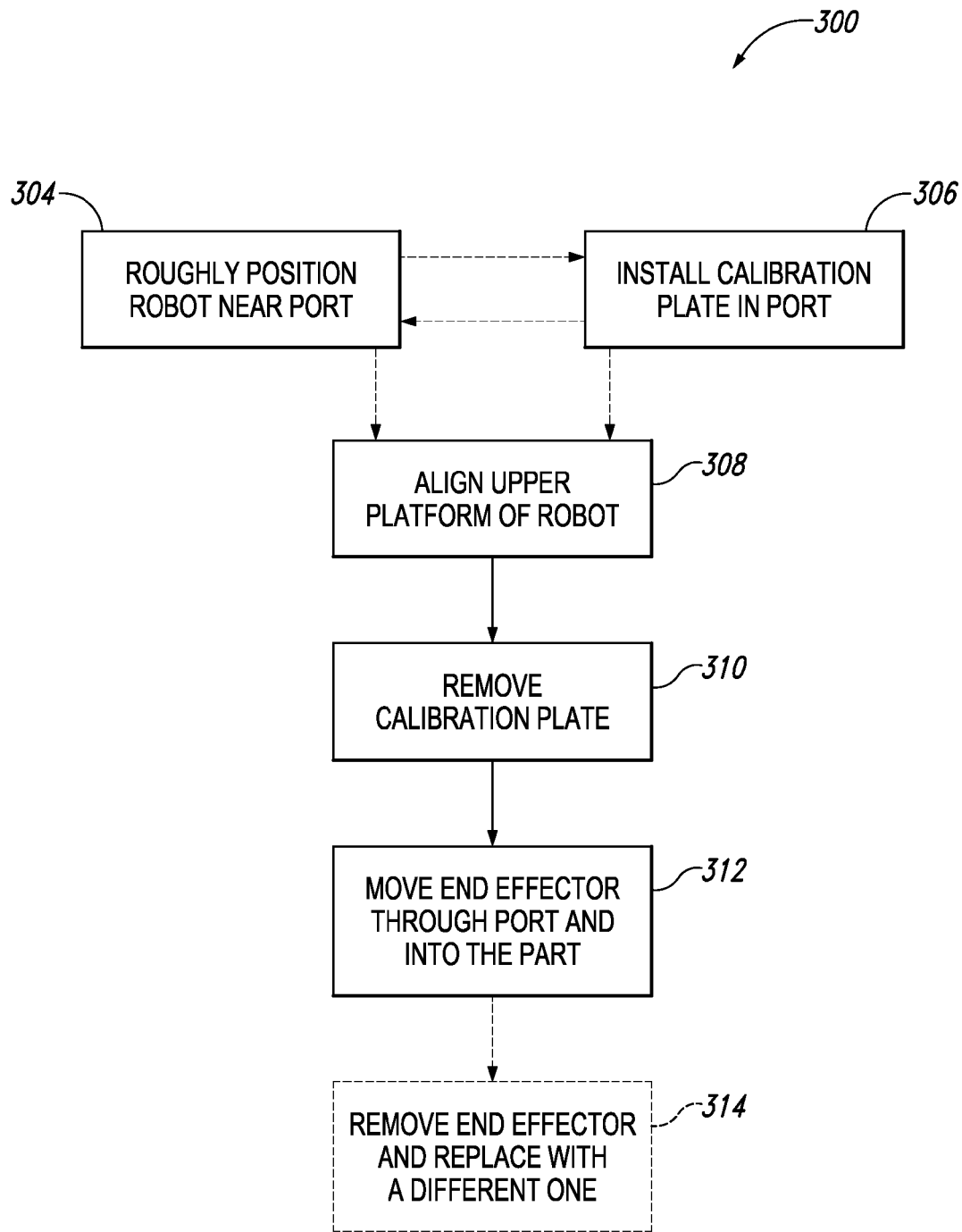
FIG. 10 is a schematic block diagram of illustrative, non-exclusive examples of methods of using a robotic alignment system according to the present disclosure.
Figure 11:
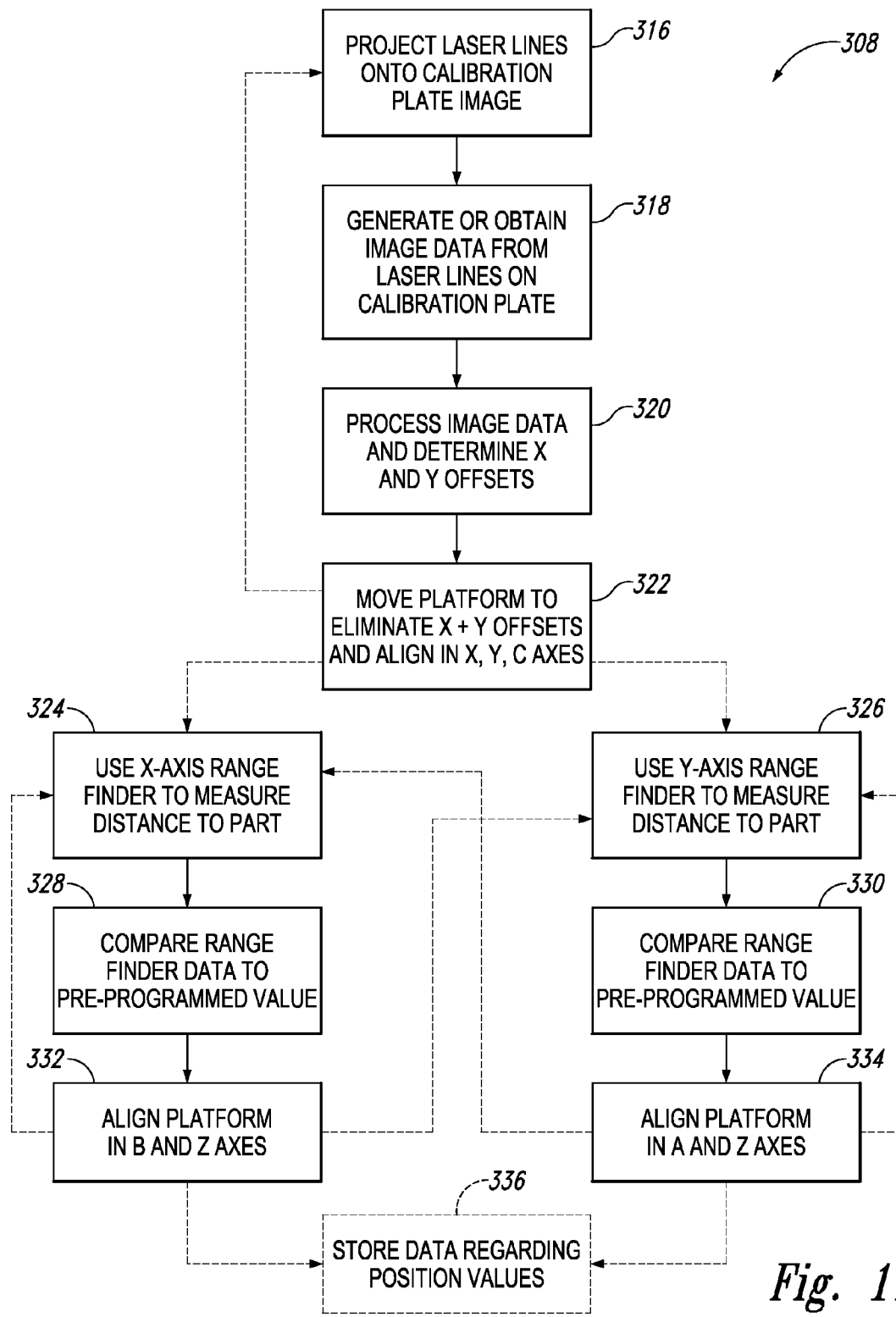
FIG. 11 is a schematic block diagram of illustrative, non-exclusive examples of methods aligning a robotic platform with respect to a part according to the present disclosure.

FIGS. 10-11 schematically provide flowcharts that represent illustrative, non-exclusive examples of methods according to the present disclosure. In FIGS. 10-11, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 10-11 are not limiting and other methods and steps are within the scope of the present disclosure, including methods having greater than or fewer than the number of steps illustrated, as understood from the discussions herein.

FIG. 10 illustrates examples of methods 300 of using a robotic alignment system according to the present disclosure. A robot according to the present disclosure may be positioned at 304 with respect to an access port or opening of a part having an interior space accessible by the access port. The robot may be roughly positioned near, under, and/or adjacent to any type of part or structure, such parts or structures generally substantially enclosing the interior space which is accessible through the opening or access port formed in the part. at 304. For example, a robot may be positioned under a part, such as a wing, and roughly aligned with the access port provided for access to the wing box (e.g., the interior space formed by the wing). A calibration plate according to the present disclosure may be positioned within the access port at 306. Alignment of the robot (e.g., an upper platform of the robot) may be performed at 308. Such alignment may include aligning an upper platform of the robot with respect to the calibration plate. The aligning may be performed autonomously by the robot, and/or may be initiated manually. Once the upper platform is aligned with respect to the calibration plate and/or part, the calibration plate may be removed from the access port at 310. The robot may then move a robotic arm having an end effector coupled to one end such that the arm moves through the access port of the part, and the end effector may perform a task within an interior space of the part at 312. For example, an end effector may perform a task inside a wing box, such as inspecting, fastening, or repairing damage inside the wing box. The end effector may be removed and replaced with a different end effector in order to perform a different task within the wing box at 314.

FIG. 11 shows a schematic block diagram of examples of methods 308 of aligning an upper platform of a robot with respect to a calibration plate. Methods 308 may be performed entirely by the robot (e.g., autonomously and/or automatically). Linear lasers may be projected onto an image of the calibration plate at 316. For example, two linear lasers may be projected, the two linear lasers being approximately perpendicular to each other. In other examples, the projected lasers may be parallel to each other, or arranged at a non-parallel and non-perpendicular angle to one another. In some examples, more than two linear lasers may be projected onto the calibration image of the calibration plate. In some examples, an array of linear lasers may be projected onto the calibration plate at 316. One or more cameras coupled to the robot (e.g., positioned on the upper platform of the robot) may obtain and/or generate image data related to the visible laser beams projected onto the calibration plate image at 318. For example, two cameras may each record a picture of the lasers being projected on the calibration image. Additionally or alternatively, a camera may obtain image data regarding relative positions of the projected laser beams with respect to the calibration image, with or without capturing a picture of the visible laser beams on the calibration image. In some examples, two or more cameras may be aligned with one another on the upper platform of the robot. In some examples, two or more cameras may be arranged at an angle to one another on the upper platform of the robot (e.g., two cameras may be arranged substantially perpendicularly to one another).

Image data from the cameras may be sent to a processor and processed at 320. For example, pictures and/or image data from the cameras may be analyzed to determine offsets between the projected laser lines and aspects of the image on the calibration plate. For example, the calibration plate image may consist of a pattern of alternating light and dark squares, such as on a checkerboard. The pattern of squares may be aligned with the X and Y axis of the calibration plate. An X offset between a first projected linear laser and the X axis may be determined and a Y offset between a second projected linear laser and the Y axis may be determined as well. In some examples, the position of the projected linear lasers may be compared to the center of the calibration image to determine the X and Y offsets. Signals containing information related to the determined X and Y offsets may be sent to a controller and the upper platform may be moved accordingly at 322 (e.g., the upper platform may be moved by one or more legs being directed by the controller) in order to eliminate the determined X and Y offsets. Steps 316, 318, 320, and 322 may be repeated as desired until the upper platform is aligned and correctly positioned within desired tolerances in the X, Y, and C axes with respect to a pre-programmed desired position.

Range finders approximately aligned with the X axis and Y axis, respectively, may determine distances to a surface of the part at 324, 326. Respective measured distances may be compared to respective pre-programmed desired values at 328, 330 for each range finder. Values determined at 324 may be used to align the upper platform in the B and Z directions at 332. Values determined at 326 may be used to align the upper platform in the A and Z directions at 334. Steps 324, 328, 332, 326, 330, and/or 334 may be repeated until the upper platform of the robot is aligned with the calibration plate within desired tolerances. Once aligned, values associated with the aligned position may be stored in a memory at 336. In this manner, the upper platform of the robot may be aligned within desired tolerances (e.g., within 0.002-0.003 inches, in some examples) such that once the calibration plate is removed from the access port, the robot is aligned with respect to the access port of the part, and therefore may be able to move an end effector attached to a robotic arm through the access port and into the interior space of the part, knowing its position with respect to the access port and therefore may be configured to avoid colliding with the access port or damaging the part.

Illustrative, non-exclusive examples of inventive subject matter according to the present disclosure are described in the following Examples A-D.

Example A

Robotic Alignment Systems

One example of the present disclosure relates to a robotic alignment system configured to align a platform with an access port formed in a part. The robotic alignment system may include a robot having a base and a platform moveably coupled to the base, a laser device configured to project a visible laser beam, the laser device being coupled to the robot, a positioning device coupled to the robot, and a calibration plate having a calibration image, the calibration plate being configured to be positioned within the access port of the part.

In one instance, the base is configured to be stationary with respect to the part. For example, the robot is positioned under the part. Robotic alignment systems may also include the part itself.

In another instance, which may include the subject matter of any of the preceding instances in Example A, the platform is coupled to the base via one or more legs. Each of the one or more legs may be hinged at a first leg end to the base and hinged at a second leg end to the platform. Each of the one or more legs may be a telescoping leg. Disclosed robotic alignment systems may include six or more legs. The one or more legs may be configured to provide six degrees of freedom to the platform with respect to the base.

In another instance, which may include the subject matter of any of the preceding instances in Example A, the laser device is a linear laser and/or a plurality of laser devices. The laser device may be coupled to the platform of the robot and/or configured to project the visible laser beam onto the calibration image. The visible laser beam is a straight line or a plurality of straight lines in some instances.

In another instance, which may include the subject matter of any of the preceding instances in Example A, the calibration image is a checkerboard.

In another instance, which may include the subject matter of any of the preceding instances in Example A, the positioning device is a plurality of positioning devices. The positioning device may be one or more cameras and/or one or more laser range finders. The positioning device may be coupled to the platform of the robot.

In another instance, which may include the subject matter of any of the preceding instances in Example A, the part is a wing box for an aircraft.

In another instance, which may include the subject matter of any of the preceding instances in Example A, the calibration plate is an elliptical calibration plate.

In another instance, which may include the subject matter of any of the preceding instances in Example A, the calibration plate includes a locking mechanism configured to secure the calibration plate within the access port.

In another instance, which may include the subject matter of any of the preceding instances in Example A, the robot further includes an arm that is moveably coupled to the platform of the robot. Alternatively or additionally, the robot may include an end effector that is moveably coupled to the platform of the robot. The end effector may be coupled to a first end of the arm and the arm may be coupled to the platform of the robot at a second end of the arm. The arm may be configured to move the end effector through the access port and into an interior space within the part. The arm may be removable and interchangeable with one or more accessory arms.

In another instance, which may include the subject matter of any of the preceding instances in Example A, the robot is configured to automatically align the platform with respect to the access port via information received from the positioning device.

Example B

Methods

Another example of the present disclosure is a method including positioning a platform with respect to an access port using a robotic alignment system of any instance of Example A, and moving an end effector through the access port and into an interior space within the part.

Such methods may also include performing a task within the interior space using the end effector.

Example C

Methods of Aligning a Platform of a Robot

Another example of the present disclosure is a method of aligning a platform of a robot with respect to an access port formed in a part, the method including positioning a robot base in the proximity of the access port of the part, inserting a calibration plate within the access port, and instructing the robot to align and position the platform in a desired position with respect to the calibration plate.

In one instance, the method further includes mounting a robotic arm on the platform of the robot.

In another instance, which may include the subject matter of any of the preceding instances in Example C, the method includes coupling an end effector to the robot.

In another instance, which may include the subject matter of any of the preceding instances in Example C, the method includes removing the calibration plate.

In another instance, which may include the subject matter of any of the preceding instances in Example C, the method includes instructing the robot to perform a task within an interior space of the part. The part may be a wing box of an aircraft in any of the instances of Example C.

In another instance, which may include the subject matter of any of the preceding instances in Example C, the inserting the calibration plate within the access port comprises contacting one or more periphery locators on the calibration plate with the access port and engaging a locking mechanism on the calibration plate to lock the calibration plate in place within the access port.

Example D

Methods of Aligning a Platform of a Robot

Another example of the present disclosure relates to a method of aligning a platform of a robot with respect to an access port formed in a part, the method comprising projecting one or more laser lines onto a calibration plate that is positioned within or over the access port, determining a current position of the platform, comparing the current position with a pre-programmed desired position to calculate dimensional offsets between the current position and the pre-programmed desired position, and moving the platform towards the pre-programmed desired position by eliminating the calculated dimensional offsets.

In one instance, the determining a current position of the platform comprises taking a picture of the one or more laser lines projected on the calibration plate using a camera coupled to the platform and processing the picture to determine one or more of the dimensional offsets. The processing the picture of the one or more laser lines may comprise determining a dimensional offset in the X, Y, and C directions.

In another instance, which may include the subject matter of any of the preceding instances in Example D, the method includes communicating dimensional offset data to a robot controller, wherein the robot controller is configured to direct the moving the platform towards the pre-programmed desired position.

In another instance, which may include the subject matter of any of the preceding instances in Example D, the determining a current position of the platform comprises measuring a distance between the platform and the part using a laser range finder.

In another instance, which may include the subject matter of any of the preceding instances in Example D, the measuring a distance between the platform and the part using a laser range finder comprises measuring a first distance between the platform and the part using a first laser range finder positioned on or near an X-axis of the platform and measuring a second distance between the platform and the part using a second laser range finder positioned on or near a Y-axis of the platform.

In another instance, which may include the subject matter of any of the preceding instances in Example D, the moving the platform towards the pre-programmed desired position comprises moving the platform in the B-axis and Z-axis using dimensional offsets calculated from the first distance and moving the platform in the A-axis and Z-axis using dimensional offsets calculated from the second distance.

In another instance, which may include the subject matter of any of the preceding instances in Example D, the projecting one or more laser lines comprises projecting a first laser line and a second laser line, the first laser line being substantially perpendicular to the second laser line.

In another instance, which may include the subject matter of any of the preceding instances in Example D, the method further comprises repeating one or more of the projecting one or more laser lines onto a calibration plate, the determining a current position of the platform, the comparing the current position with a pre-programmed desired position, and the moving the platform towards the pre-programmed desired position by eliminating the calculated dimensional offsets.

In another instance, which may include the subject matter of any of the preceding instances in Example D, the method further comprises moving an end effector coupled to a robotic arm coupled to the platform through the access port and into an interior space within the part and performing a task within the interior space using the end effector.

The part may be a wing box of an aircraft in any of the instances of Example D.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

In the event that any of the patent documents that are incorporated by reference herein define a term in a manner that is inconsistent with either the non-incorporated disclosure of the present application or with any of the other incorporated patent documents, the non-incorporated disclosure of the present application shall control with respect to the present application, and the term or terms as used in an incorporated patent document shall only control with respect to the document in which the term or terms are defined.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A robotic alignment system comprising:
   a robot having a base and a platform moveably coupled to the base, wherein the base is configured to be stationary with respect to the platform, and wherein the robot is positioned near a part having an access port that is configured to allow access to an interior space within the part;
   a laser device configured to project a visible laser beam, the laser device being coupled to the robot;
   a camera coupled to the robot;
   a laser range finder coupled to the robot; and
   a calibration plate having a calibration image, the calibration plate including periphery locators and/or surface locators for selectively positioning the calibration plate within and selectively removing the calibration plate from the access port of the part, wherein the robotic alignment system is configured to autonomously align the platform with respect to the calibration plate, thereby effectively aligning the robot with respect to the access port of the part, and wherein the robot is configured to perform a task within the interior space of the part after the calibration plate is removed from within the access port of the part.

2. The robotic alignment system according to claim 1, wherein the platform is coupled to the base via one or more telescoping legs, the legs being configured to move the platform in six degrees of freedom relating to the base.

3. The robotic alignment system according to claim 1, wherein the laser device comprises a linear laser.

4. The robotic alignment system according to claim 1, wherein the laser device is configured to project the visible laser beam onto the calibration image.

5. The robotic alignment system according to claim 1, wherein the calibration image is a checkerboard pattern.

6. The robotic alignment system according to claim 1, further comprising the part comprising the access port, wherein the part is a wing box for an aircraft.

7. The robotic alignment system according to claim 1, wherein the calibration plate comprises a locking mechanism configured to secure the calibration plate within the access port.

8. The robotic alignment system according to claim 1, wherein the robot further comprises:
   an arm that is moveably coupled to the platform of the robot; and
   an end effector coupled to a first end of the arm, wherein the arm is coupled to the platform of the robot at a second end of the arm, the arm being configured to move the end effector into the interior space of the part through the access port after the calibration plate is removed from within the access port of the part.

9. The robotic alignment system according to claim 1, wherein the robot is configured to automatically align the platform with respect to the access port via information received from the camera and laser range finder.

10. The robotic alignment system according to claim 1, wherein the access port is formed through a lower part surface of the part, and wherein the calibration plate comprises at least one surface locator configured to engage the lower part surface and thereby limit the extent of insertion of the calibration plate through the access port.

11. The robotic alignment system according to claim 1, wherein the calibration plate is configured to obstruct the entire access port of the part when positioned within the access port of the part.

12. A method of aligning a platform of a robot with respect to an access port formed in a part, the method comprising:
   positioning a robot base in the proximity of the access port of the part;
   inserting a calibration plate within the access port, thereby substantially entirely obstructing the access port;
   instructing the robot to align and position the platform in a desired position with respect to the calibration plate; and
   removing the calibration plate.

13. The method according to claim 12, wherein the part is a wing box of an aircraft.

14. The method according to claim 12, wherein the inserting the calibration plate within the access port comprises contacting one or more periphery locators on the calibration plate with the access port and engaging a locking mechanism of the calibration plate to lock the calibration plate in place within the access port.

15. The method according to claim 12, further comprising:
   moving an end effector coupled to the platform through the access port and into an interior space within the part; and
   performing a task on the part using the end effector within the interior space of the part, wherein the performing the task is performed after the removing the calibration plate.

16. A method of aligning a platform of a robot with respect to an access port formed in a part, the method comprising:
projecting one or more laser lines onto a calibration plate that is positioned within or over the access port;
determining a current position of the platform based on the projected laser lines and the calibration plate;
comparing the current position with a pre-programmed desired position to calculate dimensional offsets between the current position and the pre-programmed desired position; and
moving the platform towards the pre-programmed desired position by eliminating the calculated dimensional offsets, thereby aligning the platform with respect to the access port.

17. The method according to claim 16, wherein the determining a current position of the platform comprises taking a picture of the one or more laser lines projected onto the calibration plate using a camera coupled to the platform and processing the picture to determine one or more of the dimensional offsets.

18. The method according to claim 17, wherein the processing the picture of the one or more laser lines comprises determining a dimensional offset in X, Y, and C directions.

19. The method according to claim 16, further comprising communicating dimensional offset data to a robot controller, wherein the robot controller is configured to direct the moving the platform towards the pre-programmed desired position.

20. The method according to claim 16, wherein the determining a current position of the platform comprises measuring a distance between the platform and the part using a laser range finder.

21. The method according to claim 20, wherein the measuring a distance between the platform and the part using a laser range finder comprises measuring a first distance between the platform and the part using a first laser range finder positioned on or near an X-axis of the platform and measuring a second distance between the platform and the part using a second laser range finder positioned on or near a Y-axis of the platform.

22. The method according to claim 16, further comprising:
removing the calibration plate from the access port; and
moving an end effector coupled to a robotic arm coupled to the platform through the access port and into an interior space within the part and performing a task within the interior space using the end effector, wherein the moving the end effector through the access port is performed after the removing the calibration plate.

23. The method according to claim 16, further comprising:
placing the calibration plate within or over the access port, thereby temporarily blocking access to the part through the access port, wherein the placing the calibration plate is performed before the projecting one or more laser lines onto the calibration plate.

24. A method of aligning a platform of a robot with respect to an access port formed in a wing box of an aircraft, the method comprising:
positioning a robot base in the proximity of the access port of the wing box;
inserting a calibration plate within the access port;
instructing the robot to align and position the platform in a desired position with respect to the calibration plate; and
removing the calibration plate.

25. A method of aligning a platform of a robot with respect to an access port formed in a part, the method comprising:
positioning a robot base in proximity to the access port of the part;
inserting a calibration plate within the access port, wherein the inserting the calibration plate within the access port comprises contacting one or more periphery locators on the calibration plate with the access port and engaging a locking mechanism of the calibration plate to lock the calibration plate in place within the access port;
instructing the robot to align and position the platform in a desired position with respect to the calibration plate; and
removing the calibration plate.

26. A method of aligning a platform of a robot with respect to an access port formed in a part, the method comprising:
projecting one or more laser lines onto a calibration plate that is positioned within or over the access port;
determining a current position of the platform by measuring a first distance between the platform and the part using a laser range finder positioned on or near an X-axis of the platform and measuring a second distance between the platform and the part using a second laser range finder positioned on or near a Y-axis of the platform;
comparing the current position with a pre-programmed desired position to calculate dimensional offsets between the current position and the pre-programmed desired position; and
moving the platform towards the pre-programmed desired position by eliminating the calculated dimensional offsets.

27. The method according to claim 26, wherein the moving the platform towards the pre-programmed desired position comprises moving the platform in a B-axis and a Z-axis using dimensional offsets calculated from the first distance and moving the platform in an A-axis and a Y-axis using dimensional offsets calculated from the second distance.

* * * * *